United States Patent [19]

Herluison et al.

[11] Patent Number: 5,696,698
[45] Date of Patent: Dec. 9, 1997

[54] DEVICE FOR ADDRESSING A CACHE MEMORY OF A COMPRESSING MOTION PICTURE CIRCUIT

[75] Inventors: Jean-Claude Herluison, Lumbin; Jean-Luc Bauer, Sundhoffen, both of France

[73] Assignee: SGS-Thomson Microelectronics S.A., Saint Genis, France

[21] Appl. No.: 423,580

[22] Filed: Apr. 18, 1995

[30] Foreign Application Priority Data

Apr. 27, 1994 [FR] France ................... 94 05339

[51] Int. Cl.$^6$ .................. G06K 15/00; H04N 7/12
[52] U.S. Cl. .............. 364/514 A; 348/409; 382/232
[58] Field of Search .............. 364/514 A; 348/402, 348/407, 409, 410, 411, 412, 413, 416, 699; 382/232, 236, 238

[56] References Cited

U.S. PATENT DOCUMENTS

| | | | |
|---|---|---|---|
| 5,083,202 | 1/1992 | Parke | 358/105 |
| 5,099,325 | 3/1992 | Artieri et al. | 358/136 |
| 5,144,429 | 9/1992 | Haghiri et al. | 358/138 |
| 5,153,720 | 10/1992 | Kawai | 358/105 |
| 5,200,820 | 4/1993 | Charavi | 358/105 |
| 5,206,723 | 4/1993 | Parke | 358/105 |
| 5,315,388 | 5/1994 | Shen et al. | 348/718 |
| 5,457,481 | 10/1995 | Sohn et al. | 345/185 |
| 5,475,446 | 12/1995 | Yamada | 348/699 |
| 5,561,475 | 10/1996 | Jung | 348/699 |

OTHER PUBLICATIONS

French Search Report for French Patent Application No. 9405339 filed Apr. 27, 1994.

Microprocessors and Microsystems, vol. 17, No. 7, Sep. 1993 pp. 425–434, A. Richardson and M. Querol "STi 3220 Motion Estimator Processor".

IEEE Transactions on Circuits and Systems For Video Technology, vol. 2, No. 2, Jun. 1992, New York pp. 111–122, P.A. Ruetz et al. "A High–Performance Full–Motion Video Compression Chip Set".

*Primary Examiner*—Hassan Kizou
*Assistant Examiner*—A. Bnimoussa
*Attorney, Agent, or Firm*—Wolf, Greenfield & Sacks, P.C.; James H. Morris

[57] ABSTRACT

A device for addressing a cache memory of a motion picture compression circuit, executing series of comparisons to estimate the motion of a current window of pixels of a current picture with respect to a reference window of a preceding picture, includes a first cache memory partitioned into four physical segments of equal size. Each physical segment is adapted to contain one half-macroblock of the reference window, and a circuit for addressing the first cache memory, the addressing being different for a motion estimation related to a current window of even rank and for a motion estimation related to a current window of odd rank.

27 Claims, 2 Drawing Sheets

DEVICE FOR ADDRESSING A CACHE MEMORY OF A COMPRESSING MOTION PICTURE CIRCUIT

BACKGROUND OF THE INVENTION

1. Field of the Invention

The present invention relates to circuits for compressing motion pictures, such as television pictures, and more particularly to the use of cache memories included in such circuits to form motion estimations of picture portions, a current picture portion being compared with its environment in a preceding picture.

2. Discussion of the Related Art

A motion picture compression circuit is used for encoding pictures so that they cab be transmitted in a TV transmission, by minimizing the amount of information to be transmitted. The compression achieved by this circuit includes, among other operations, carrying out a motion estimation between portions of two successive pictures. This motion estimation allows the encoding, and therefore the transmission, for current picture portions that are already existing in the preceding picture, of only motion vectors associated with these portions. Each motion vector characterizes the motion between a preceding picture portion and a corresponding portion of the current picture.

For this purpose, the pictures, for example provided by a video camera, are partitioned into picture portions, referred to as "macroblocks". These macroblocks generally correspond to a partitioning of the picture into squares, each square having a 16×16-pixel size. In fact, a picture is sequentially stored line by line in a video memory. The pixels so stored are extracted from this video memory by pixel blocks corresponding to square portions of the picture. These pixel blocks, or macroblocks, are stored in a cache memory, to be used by a calculation processor designed, in particular, to determine the motion vector of the considered macroblock. Cache memories are needed because the calculation processor executes a series of comparisons on the same macroblock of a picture. Thus, the number of operations for accessing the video memory is decreased, which increases the processing speed of the pictures.

To perform motion estimation, the calculation processor uses the pixels of the considered macroblock of the current picture and the pixels surrounding the corresponding macroblock of the preceding picture. The calculation processor sequentially processes each macroblock of the current picture, constituting a current window, by using, at least partially, the pixels of the adjacent macroblocks of the preceding picture constituting a reference window in the preceding picture. A first cache memory contains a current window, and a second cache memory contains a larger reference window that includes, in addition to the pixels of the current window in the preceding picture, a portion of the macroblock pixels of the preceding picture which are sequentially adjacent thereto in all the directions.

Cache memories are conventionally addressed by loading a current window and a reference window in the cache memories before each series of comparisons used for the motion estimation of the considered macroblock.

In addition to the above-described application the present invention more generally relates to the use of a cache memory in a process involving several sets of values mutually having a sequential relationship. The invention more particularly applies to a process in which a series of operations has to be performed on two sets of values. The first set corresponds to a set of current values and the second set corresponds to a set of reference values, at least a portion of the reference set being used for the series of operations related to the next set of current values.

SUMMARY OF THE INVENTION

An object of the present invention is to minimize the loading times of the cache memory which stores the reference values, using a process such as the one described above.

To achieve this object, in one illustrative embodiment of the present invention, a device is provided for addressing a cache memory of a motion picture compression circuit, carrying out series of comparisons to estimate the motion of a current window of pixels of a current picture with respect to a reference window taken in the preceding picture. The addressing device includes a first cache memory partitioned into four physical segments of the same size, each physical segment being adapted to contain one half-macroblock of the reference window, and means for addressing the cache memory. The means for addressing operates differently for motion estimation related to a current window of even rank as compared to motion estimation related to a current window of odd rank.

According to an embodiment of the invention, the device additionally includes a second cache memory for containing a macroblock of pixels of the current picture constituting the current window, and means for loading the second cache memory, before each motion estimation, with pixels of a new current window.

According to a further embodiment of the invention, the device also includes means for loading, before each motion estimation, two of the four segments of the first cache memory, the last two half-macroblocks of a reference window being loaded in the last two segments for a motion estimation of even rank, and in the first two segments for a motion estimation of odd rank, respectively.

According to another embodiment of the invention, the device also includes means for reading the first cache memory, by assigning the content of the first two segments to the first two half-macroblocks of the reference window for a motion estimation of even rank, and to the last two half-macroblocks for a motion estimation of odd rank, respectively. The content of the last two segments is assigned to the last two half-macroblocks of the reference window for a motion estimation of even rank and to the first two half-macroblocks of the reference window for a motion estimation of odd rank, respectively.

In another illustrative embodiment of the invention, a method is provided for compressing motion pictures, executing a motion estimation of a macroblock of pixels of a current picture, and storing a reference window in a first cache memory by including, in addition to the current macroblock in the preceding picture, the two half-macroblocks sequentially surrounding the last one, in the preceding picture. The motion picture compression method further includes addressing the first cache memory, the addressing being different for a motion estimation of a current macroblock of even rank and for a motion estimation of a current macroblock of odd rank.

According to another embodiment of the invention, the method includes partitioning the first cache memory into four physical segments, and partitioning a reference window into four half-macroblocks, and addressing, for an even rank motion estimation, the first two physical segments as containing the first two half-macroblocks and the last two physical segments as containing the last two half-macroblocks of the reference window and, for an odd rank motion estimation, the last two physical segments as containing the first two half-macroblocks and the first two physical segments as containing the last two half-macroblocks of the reference window.

According to another embodiment of the invention, the method includes, between each motion estimation, loading in a second cache memory a macroblock of pixels of a current picture and, in the first cache memory, two half-macroblocks of the preceding picture, two other half-macroblocks of the reference window having been loaded for the motion estimation related to the macroblock of the current picture.

According to another embodiment of the invention, the method uses a state machine for controlling the calculation process of the addresses of the first cache memory.

In another illustrative embodiment of the invention, a method is provided for addressing a cache memory designed to be used in a process executing a series of operations on two sets of values, a first set corresponding to a set of current values and a second set corresponding to a set of reference values stored in the cache memory. At least a portion of the reference see is used for a series of operations related to a following set of current values. The method includes addressing the cache memory, differently for a series of operations of even rank and for a series of operations of odd rank.

According to one embodiment of the invention, the method includes partitioning the cache memory into four physical segments, and the set of reference values into four logic sub-sets having an identical size, and to address, for a series of operations of even rank, the first two physical segments as containing the first two logic sub-sets and the last two physical segments as containing the last two logic sub-sets and, for a series of operations of odd rank, the last two physical segments as containing the first two logic sub-sets and the first two physical segments as containing the last two logic subsets.

Addressing, according to the invention, the cache memory differently for the motion estimations, or series of comparisons, of even rank and for the motion estimations, or series of comparisons, of odd rank allows minimization of the loading times of the cache memory. In fact, one half of a reference window stored in the cache memory for a series of comparisons of rank "i" related to a current window can be used again for the following series of comparisons of rank i+1 related to the next current window. It is no longer necessary, as in the related art, to load the whole reference window before each series of comparisons. It is sufficient to load one half of this window between each motion estimation, the invention allowing each half of the reference window to be used during two successive series of comparisons.

Thus, the time required to load the first cache memory of the motion picture compression circuit, between two motion estimations is decreased by one half. The loading of a whole reference window, that is, two macroblocks, is only needed at the passage from a first row of macroblocks to a second row or at the beginning of a new picture.

The foregoing and other objects, features, aspects and advantages of the invention will become apparent from the following detailed description of the present invention when taken in conjunction with the accompanying drawings.

BRIEF DESCRIPTION OF DRAWINGS

In the drawings, FIG. 1 schematically represents an exemplary implementation of cache memories in a motion picture compression circuit according to the invention.

DETAILED DESCRIPTION

Figure 1:
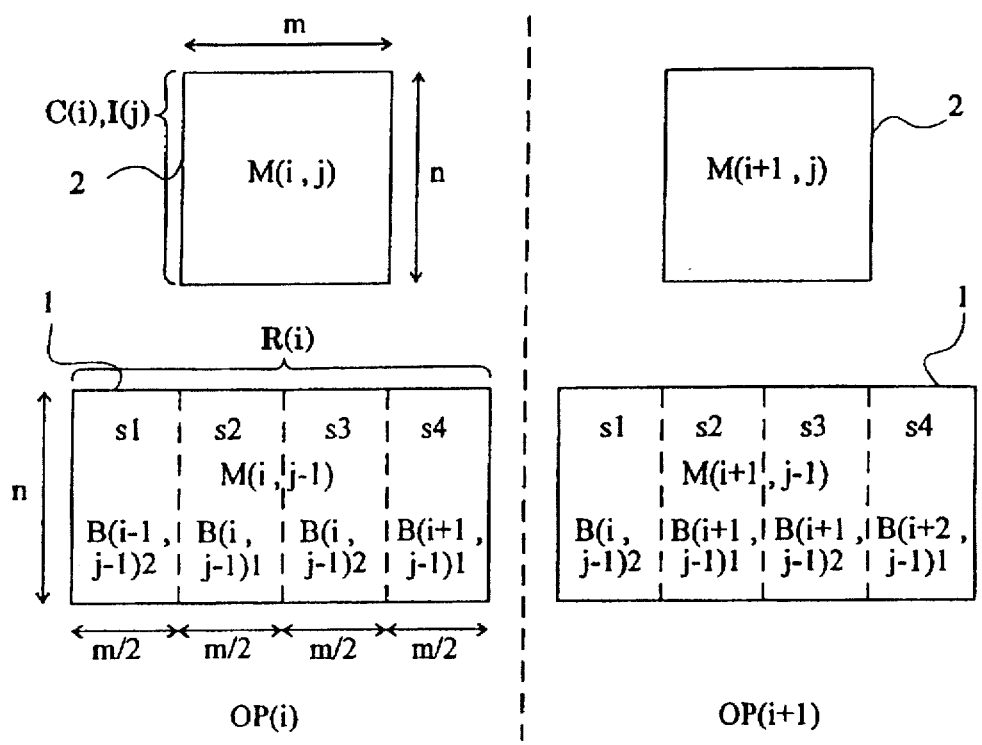

In the example represented in FIG. 1, a macroblock $M(i,j)$, constituted by a matrix of mxn pixels of a current picture $I(j)$, forms a current window $C(i)$ to which a comparison process must be applied to estimate the motion of this macroblock with respect to a preceding picture $I(j-1)$. Index i designates the sequential position, or rank, of the macroblock in the picture, and index j designates the picture rank. Macroblock $M(i,j)$ is stored in a cache memory 2. The comparison is performed with respect to a reference window $R(i)$, formed by a matrix of n lines and 2 m columns. This reference window $R(i)$ corresponds to two macroblocks of the preceding picture $I(j-1)$. Window $R(i)$, in addition to macroblock $M(i,j-1)$, includes the equivalent of two half-macroblocks of pixels sequentially surrounding the latter in the preceding picture $I(j-1)$. These pixels correspond to a second half $B(i-1,j-1)2$ of macroblock $M(i-1,j-1)$ and to a first half $B(i+1,j-1)1$ of macroblock $M(i+1,j-1)$ of the preceding picture $I(j-1)$. The reference window $R(i)$ is partitioned into four half-macroblocks $B(i-1,j-1)2$, $B(i,j-1)1$, $B(i,j-1)2$, $B(i+1,j-1)1$, each containing a matrix of pixels of n lines and m/2 columns. Each half-macroblock is contained in a physical segment s1, s2, s3, s4 of a cache memory 1 which is partitioned for this purpose. The motion estimation includes performing a series of comparisons $OP(i)$ on these two picture windows $C(i)$ and $R(i)$. An elementary comparison is performed on a pair of macroblocks $M(i,j)$, $\{B(i-1,j-1)2, B(i,j-1)1\}$, then by shifting by one column at each elementary comparison, up to the macroblock pair $M(i,j)$, $\{B(i,j-1)2, B(i+1,j-1)1\}$.

In practice, once the motion estimation is performed in all the directions of the picture, a current window is compared to a reference window corresponding to four macroblocks. Macroblock $M(i,j)$ is effectively compared by taking into account the half-macroblocks surrounding its position in the preceding picture $I(j-1)$ in all the directions. For the sake of simplification, only the sequential motions in the horizontal direction of the picture are shown. However, the motion estimation in the vertical direction is performed in the same manner, by repeating series of comparisons, shifting line by line pairs of macroblocks included in the reference window.

The present invention is based on the fact that two successive series of comparisons, or motion estimations, $OP(i)$ and $OP(i+1)$ use two successive macroblocks $M(i,j)$ and $M(i+1,j)$ of the current picture $I(j)$ that are distinct but correspond to two adjacent reference windows $R(i)$ and $R(i+1)$. The two reference windows $R(i)$ and $R(i+1)$ are sequentially associated, i.e., they have two common half-macroblocks $B(i,j-1)2$ and $B(i+1,j-1)1$. In other words, the last two half-macroblocks of a reference window $R(i)$ correspond to the first two half-macroblocks of the next reference window $R(i+1)$.

Figure 2:
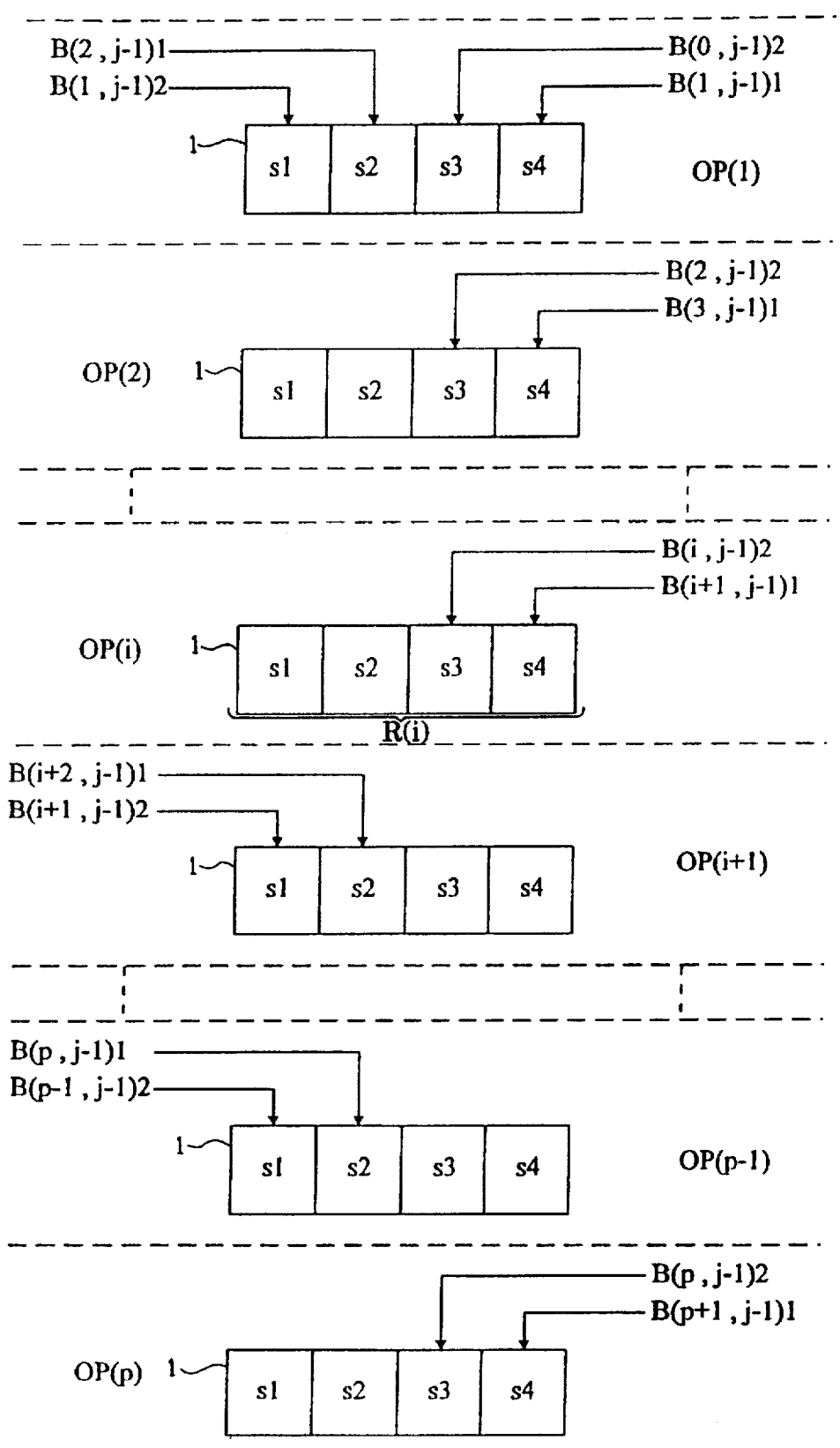
FIG. 2 schematically represents an exemplary loading mode of a cache memory, according to the invention, to perform a motion estimation of a row of macroblocks of a motion picture.

FIG. 2 illustrates the loadings performed in the cache memory 1 for the motion estimation of a row of macroblocks of the current picture.

After a first series of comparisons $OP(1)$ for which the four half-macroblocks $B(0,j-1)2$, $B(1,j-1)1$, $B(1,j-1)2$, and $B(2,j-1)1$ have been stored in the segments s3, s4, s1 and s2, respectively, only the last two half-macroblocks of the reference window R(2), for each series of comparisons, are loaded in the cache memory 1.

To perform the series of comparisons OP(2), the two half-macroblocks B(2,j-1)2 and B(3,j-1)1 are stored in segments s3 and s4, the two half-macroblocks B(1,j-1)2 and B(2,j-1)1 being already present in segments s1 and s2 since they have been used for the series of comparisons OP(1), as the last two half-macroblocks of the reference window R(1). Then, the first two segments s1 and s2 are addressed as including the first two half-macroblocks B(1,j-1)2 and B(2,j-1)1 of window R(2) respectively, and the last two segments s3 and s4 as including the last two half-macroblocks B(2,j-1)2 and B(3,j-1)1 of window R(2), respectively.

To perform a series of comparisons OP(i), i.e., even rank comparisons, the half-macroblocks B(i,j-1)2 and B(i+1,j-1)1 are stored in segments s3 and s4, the two half-macroblocks B(i-1,j-1)2 and B(i,j-1)1 being already present in segments s1 and s2 of the cache memory 1 since they were used for the preceding series of comparisons OP(i-1) as the last two half-macroblocks of the reference window R(i-1). The first two segments s1 and s2 are addressed as including the first two half-macroblocks B(i-1,j-1)2 and B(i,j-1)1 of window R(i) respectively, and the last two segments s3 and s4 as including the last two half-macroblocks B(i,j-1)2 and B(i+1,j-1)1 of window R(i), respectively.

To perform a series of comparisons OP(i+1), i.e., odd rank comparisons, the half-macroblocks B(i+1,j-1)2 and B(i+2,j-1)1 are stored in segments s1 and s2, the two half-macroblocks B(i,j-1)2 and B(i+1,j-1)1 being already present in segments s3 and s4 of the cache memory 1 since they were used for the preceding series of comparisons OP(i) as the last two half-macroblocks of the reference window R(i). Then, the first two segments s1 and s2 are addressed as including the first two half-macroblocks B(i+1,j-1)2 and B(i+2,j-1)1 of window R(i+1), respectively, and the last two segments s3 and s4 as including the first two half-macroblocks B(i,j-1)2 and B(i+1,j-1)1 of window R(i+1), respectively.

As the process includes p series of comparisons, corresponding to the number of macroblocks in a row of macroblocks in the picture, this loading mode is continued until the series of comparisons OP(p). In the example represented in FIG. 2, the process achieves an even number, p, of series of comparisons, or motion estimations, OP(i). The loading and addressing mode is identical in case of an odd number of series of comparisons OP(i). The first series of comparisons OP(1) was of odd rank, but the process optionally could be implemented with a first series of even rank.

The address calculations to be achieved for implementing the invention can, for example, be performed in a state machine controlling the process.

As can be seen, the invention allows, for the motion estimation of a row of p macroblocks of the current picture, the loading of only the equivalent of p+1 macroblocks of pixels, i.e., the equivalent of (p+1)/2 reference windows whereas it was previously needed to load p reference windows, i.e., the equivalent of 2p macroblocks.

In an implementation of the invention adapted to a videophone, a macroblock corresponds to a square matrix of 16×16 pixels, one half-macroblock corresponding to a 16×8-pixel matrix.

The above description, relative to a motion estimation process for motion pictures, can be extended to any process using two successive and discontinuous sets C(i) and C(i+1) of current values, and two continuous sets R(i) and R(i+1) of reference values.

Figure 3:
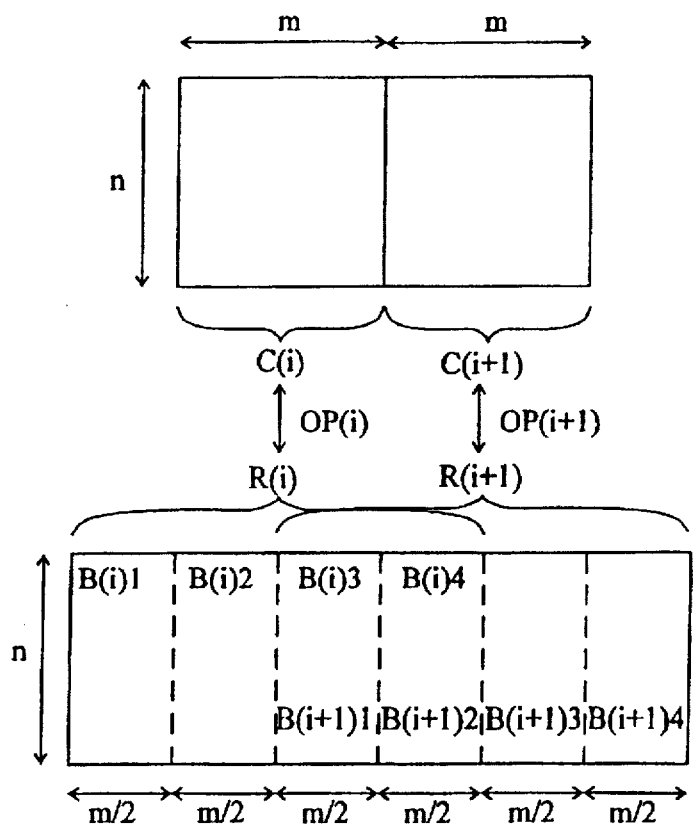
FIG. 3 schematically represents two sequentially associated sets of values such as those to which the invention applies.

FIG. 3 illustrates this general application by representing an example of two sets of sequentially associated values to which the present invention may apply.

In this example, a set of current values C(i), constituted by a matrix of n lines and m columns, constitutes one of the operands of a process OP(i) whose second operand is formed by a set of reference values R(i). Set R(i) is constituted by a matrix of n lines and 2 m columns partitioned into four logic sub-sets B(i)1, B(i)2, B(i)3, and B(i)4, each corresponding to a matrix of n lines and m/2 columns. The process includes performing a series of operations OP(i) on two sets of values C(i) and R(i). An elementary operation is performed on a pair of matrices having the same size, for example on the pair of matrices C(i), {B(i)2, B(i)3}. The series of operations is performed on the pair of matrices C(i), {B(i)1, B(i)2}, then by shifting by one column at each elementary operation, to the pair of matrices C(i), {B(i)3, B(i)4}. The two sets R(i) and R(i+1) are sequentially associated, the sub-sets B(i+1)1 and B(i+1)2 correspond to the sub-sets B(i)3 and B(i)4, respectively.

The sets of reference values R(i) and current values C(i) are stored in cache memories to be used by a calculation processor performing the series of operations.

To perform a series of operations OP(i), referred to as an even rank operation, the logic sub-sets B(i)3 and B(i)4 are stored in segments s3 and s4 of a cache memory, the sub-sets B(i)1 and B(i)2 being already present in segments s1 and s2 of the cache memory since they were used for the preceding series of operations OP(i-1) as being the sub-sets B(i-1)3 and B(i-1)4. The first two segments s1 and s2 are addressed as including the subsets B(i)1 and B(i)2, respectively, and the last two segments s3 and s4 as including the sub-sets B(i)3 and B(i)4, respectively.

To perform a series of operations OP(i+1), referred to as an odd rank operation, the logic sub-sets B(i+1)3 and B(i+1)4 are stored in segments s1 and s2 of the cache memory, the sub-sets B(i+1)1 and B(i+1)2 being already present in segments s3 and s4 of the cache memory since they were used for the preceding series of operations OP(i) as the sub-sets B(i)3 and B(i)4. Then, the first two segments s1 and s2 are addressed as including the sub-sets B(i+1)3 and B(i+1)4, respectively, and the last two segments s3 and s4 as including the sub-sets B(i+1)1 and B(i+1)2, respectively.

As is apparent to those skilled in the art, various modifications can be made to the above disclosed preferred embodiments. More particularly, the invention may apply to any type of process, using comparators, adders, subtracters, etc., or any combination of elementary operators. Similarly, the sets of values may correspond to matrices of arbitrary square or rectangular size. Furthermore, while the invention has been described considering that two sub-sets of reference values were common to two sequentially adjacent sets, alternatively an arbitrary number of sub-sets of a reference set could be common to a following reference set.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. In a motion picture compression circuit that executes a series of comparisons to estimate motion of each current window of pixels in a sequence of current windows of a current picture with respect to a corresponding reference window in a sequence of reference windows .of a preceding picture, each current window having a rank that designates its sequential position in the sequence of current windows, the sequence of current windows including a currently processed current window., the sequence of reference windows including a currently processed reference window, a device comprising:

a first cache memory partitioned into four physical segments of equal size, each physical segment being adapted to contain one half-macroblock of the currently processed reference window; and means for addressing the first cache memory, when executing the series of comparisons that estimate motion of the currently processed current window with respect to the currently processed reference window, in a first manner when the currently processed current window has an even rank, and in a second manner when the currently processed current window has an odd rank, the first and second manners of addressing the first cache memory being different.

2. The device of claim 1, further including:

a second cache memory adapted to contain a macroblock of pixels of the currently processed current window; and means for loading the second cache memory with the macroblock of pixels of the currently processed current window before executing the series of comparisons to estimate motion of the currently processed current window with respect to the currently processed reference window.

3. The device of claim 2, wherein the physical segments of the first cache memory include a first pair of segments and a second pair of segments, and wherein each reference window includes a first pair of half-macroblocks and a second pair of half-macroblocks, the device further including:

means for loading, prior to executing the series of comparisons to estimate motion of a next current window in the sequence of current windows with respect to a next reference window, the second pair of half-macroblocks of the next reference window into the first pair of segments of the first cache memory when the next current window has an even rank, and into the second pair of segments when the next current window has an odd rank.

4. The device of claim 3, wherein each segment stores a half-macroblock, and wherein the device further includes:

means for reading the currently processed reference window from the first cache memory by respectively assigning contents of the first and second pairs of segments of the first cache memory to the first and second pairs of half-macroblocks of the currently processed reference window when the currently processed current window has an even rank, and by respectively assigning the contents of the first and second pairs of segments of the first cache memory to the second pair and first pair of half-macroblocks of the currently processed reference window when the currently processed current window has an odd rank.

5. A method for addressing a memory of a motion picture compression circuit that determines a motion estimation of each current macroblock of pixels in a sequence of current macroblocks of a current picture with respect to a corresponding reference window in a sequence of reference windows of a preceding picture, each current macroblock having a rank that designates its sequential position in the sequence of current macroblocks, the method comprising the steps of, for each one of the current macroblocks:

A. partitioning one of the reference windows of the preceding picture that corresponds to the one of the current macroblocks into a first half-macroblock, a second half-macroblock, a third half-macroblock, and a fourth half-macroblock, the one of the reference windows including a corresponding macroblock having a position in the preceding picture that corresponds to a position of the one of the current macroblocks in the current picture, the one of the reference windows further including first and second half-macroblocks that are positioned on opposing sides of the corresponding macroblock in the preceding picture;

B. partitioning a first cache memory into a first physical segment, a second physical segment, a third physical segment, and a fourth physical segment, each physical segment being adapted to contain one of the half-macroblocks of the one of the reference windows;

C. storing in the first cache memory the one of the reference windows; and

D. addressing the first cache memory in a first manner when the one of the current macroblocks has an even rank, and in a second manner when the one of the current macroblocks has an odd rank, the first and second manners of addressing the first cache memory being different.

6. The method of claim 5, wherein step D includes, for each one of the current macroblocks:

when the one of the current macroblocks has an even rank, addressing the first and second physical segments of the first cache memory as containing the first and second half-macroblocks of the one of the reference windows that corresponds to the one of the current macroblocks and addressing the third and fourth physical segments of the first cache memory as containing the third and fourth half-macroblocks of the one of the reference windows that corresponds to the one of the current macroblocks, and when the one of the current macroblocks has an odd rank, addressing the third and fourth physical segments of the first cache memory as containing the first and second half-macroblocks of the one of the reference windows that corresponds to the one of the current macroblocks, and the first and second physical segments of the first cache memory as containing the third and fourth half-macroblocks of the one of the reference windows that corresponds to the one of the current macroblocks.

7. The method of claim 6, further including the step of sequentially loading, in a second cache memory, each current macroblock of pixels of the current picture; and wherein step C includes, for each one of the reference windows subsequent to a first reference window in the sequence of reference windows, loading in the first cache memory the third and fourth half-macroblocks of the one of the reference windows, the first and second half-macroblocks of the one of the reference windows having been loaded previously into the first cache memory as part of a preceding reference window.

8. The method of claim 6, wherein step D is performed using a state machine that controls calculation of each address of the first cache memory.

9. A method for addressing a cache memory during a process that executes a series of operations, each of the operations being executed on a first set of current values and a second set of reference values stored in the cache memory, each of the operations having a rank that defines its sequential position in the series of operations, each set of reference values including at least one value that is used during the execution of two successive operations, the method including the step of:

A. partitioning the first set of reference values stored in the cache memory into a first sub-set, a second sub-set, a third sub-set, and a fourth sub-set;

B. partitioning the cache memory into a first physical segment, a second physical segment, a third physical segment, and a fourth physical segment, each physical segment being adapted to contain one of the sub-sets of the first set of reference values; and C. addressing the cache memory differently for operations having even and odd ranks.

10. The method of claim 9, wherein step C includes:
   addressing the first and second physical segments of the cache memory as containing the first and second sub-sets of the sets of reference values and the third and fourth physical segments as containing the third and fourth sub-sets, for operations having an even rank; and
   addressing the third and fourth physical segments of the cache memory as containing the first and second sub-sets of the set of reference values and the first and second physical segments as containing the third and fourth sub-sets for operations having an odd rank.

11. A method for comparing a series of current picture portions to a series of reference picture portions in a motion picture compression circuit that includes a cache memory that stores a first reference picture portion of the series of reference picture portions, the first reference picture portion including a first set of macroblocks and a second set of macroblocks, a second reference picture portion of the series of reference picture portions including the second set of macroblocks and a third set of macroblocks, the method comprising the steps of:

A. loading, while maintaining the second set of macroblocks in the cache memory, the third set of macroblocks in the cache memory so that the third set of macroblocks is overwritten over the first set of macroblocks, and the cache memory includes the second and third sets of macroblocks that form the second reference picture portion; and B. comparing the second reference picture portion loaded in the cache memory to a second current picture portion in the series of current picture portions.

12. The method of claim 11, wherein the first and third sets of macroblocks are equal in size, and wherein step A includes the step of:
   overwriting, in the cache memory, the first set of macroblocks with the third set of macroblocks.

13. The method of claim 12, wherein each set of macroblocks has a size equal to one macroblock and the cache memory has a size equal to two macroblocks.

14. The method of claim 11, wherein each in the series of reference picture portions corresponds to one in the series of current picture portions, and wherein the method further includes the steps of, for at least one additional current picture portion in the series of current picture portions:

C. loading, while maintaining in the cache memory a previous set of macroblocks that formed a portion of a preceding reference picture portion, a new set of macroblocks in the cache memory, the new and previous sets of macroblocks forming the reference picture portion that corresponds to the at least one additional current picture portion; and D. comparing the at least one additional current picture portion to its corresponding reference picture portion loaded in the cache memory.

15. The method of claim 14, wherein the cache memory includes a first section and a second section, wherein the at least one additional current picture portion includes a plurality of additional current picture portions, each additional current picture portion having a rank in the plurality of additional current picture portions, and wherein the method further includes the step of:
   repeating steps C and D for each of the plurality of current picture portions, and
   wherein step C includes the step of loading the new set of macroblocks in the first section for additional current picture portions having an even rank and in the second section for additional current picture portions having an odd rank.

16. A device for comparing a series of current picture portions to a series of reference picture portions in a motion picture compression circuit that includes a cache memory capable of storing one of a series of reference picture portions, the device comprising:
   means for loading a first reference picture portion of the series of reference picture portions into the cache memory, the first reference picture portion including a first set of macroblocks and a second set of macroblocks, and loading, while maintaining the second set of macroblocks in the cache memory, a third set of macroblocks in the cache memory so that the third set of macroblocks is overwritten over the first set of macroblocks, and the cache memory includes the second and third sets of macroblocks, the second and third sets of macroblocks forming a second reference picture portion; and
   means for comparing the second reference picture portion loaded in the cache memory to a second current picture portion in the series of current picture portions.

17. The device of claim 16, wherein the first and third sets of macroblocks are equal in size, and wherein the means for loading the third set of macroblocks includes:
   means for overwriting, in the cache memory, the first set of macroblocks with the third set of macroblocks.

18. The device of claim 17, in combination with the cache memory, and wherein each set of macroblocks has a size equal to one macroblock and the cache memory has a size equal to two macroblocks.

19. The device of claim 16, wherein each current picture portion has a rank that defines its position within the series of current picture portions, wherein the cache memory includes a first section and a second section, and wherein the means for comparing further includes means for comparing a next one of the series of current picture portions to a corresponding next one of the series of reference picture portions, the device further including:
   means for updating the cache memory to include the next one of the series of reference picture portions that corresponds to the next one of the series of current picture portions to be compared, the means for updating including the means for loading, the means for loading further including
   means for loading a next set of macroblocks into the first section of the cache memory to form the corresponding next one of the series of reference picture portions when the next one of the current picture portions has an even rank, and into the second section of the cache memory to form the corresponding next one of the series of reference picture portions when the next one of the current picture portions has an odd rank.

20. The device of claim 19, wherein the next set of macroblocks has a size equal to the size of each of the current picture portions.

21. A device for comparing a series of current picture portions to a series of reference picture portions in a motion picture compression circuit that includes a cache memory capable of storing one of a series of reference picture portions, the device comprising:

loading circuitry that loads a first reference picture portion of the series of reference picture portions into the cache memory, the first reference picture portion including a first set of macroblocks and a second set of macroblocks, and loads, while maintaining the second set of macroblocks in the cache memory, a third set of macroblocks in the cache memory so that the third set of macroblocks is overwritten over the first set of macroblocks, and the cache memory includes the second and third sets of macroblocks, the second and third set of macroblocks forming a second reference picture portion; and comparing circuitry that compares the second reference picture portion loaded in the cache memory to a second current picture portion in the series of current picture portions.

22. The device of claim 21, wherein the first and third sets of macroblocks are equal in size, and wherein the second loading circuitry that loads the third set of macroblocks includes:

overwriting circuitry that overwrites, in the cache memory, the first set of macroblocks with the third set of macroblocks.

23. The device of claim 22, in combination with the cache memory, and wherein each set of macroblocks has a size equal to one macroblock and the cache memory has a size equal to two macroblocks.

24. The device of claim 21, wherein each of the series of current picture portions has a rank that defines its position within the series of current picture portions, wherein the cache memory includes a first section and a second section, and wherein the comparing circuitry includes circuitry that compares a next one of the series of current picture portions to a corresponding next one of the series of reference picture portions, the device further including:

updating circuitry that updates the cache memory to include the next one of the series of reference picture portions that corresponds to the next one of the series of current picture portions to be compared, the updating circuitry including the loading circuitry, the loading circuitry further including circuitry that loads a next set of macroblocks into the first section of the cache memory to form the corresponding next one of the series of reference picture portions when the next one of the current picture portions has an even rank, and into the second section of the cache memory to form the corresponding next one of the series of reference picture portions when the next one of the current picture portions has an odd rank.

25. The device of claim 24, wherein the next set of macroblocks has a size equal to the size of each of the current picture portions.

26. A motion picture compression system for comparing a current picture to a reference picture, the current picture including a series of current picture portions, the reference picture including a series of reference picture portions, the system comprising:

a cache memory that is capable of storing one of a series of reference picture portions;

means for loading the cache memory with a first reference picture portion of the series of reference picture portions, the first reference picture portion including a first set of macroblocks and a second set of macroblocks;

means for loading, while maintaining the second set of macroblocks in the cache memory, a third set of macroblocks in the cache memory so that the third set of macroblocks is overwritten over the first set of macroblocks, and the cache memory includes the second and third sets of macroblocks, the second and third set of macroblocks forming a second reference picture portion; and means for reading and comparing the second reference picture portion loaded in the cache memory to a second current picture portion in the series of current picture portions.

27. The device of claim 26, wherein the means for loading a third set of macroblocks further includes:

means for overwriting the first set of macroblocks with the third set of macroblocks in the cache memory.

* * * * *